US008725294B2

(12) United States Patent
Gienger

(10) Patent No.: US 8,725,294 B2
(45) Date of Patent: May 13, 2014

(54) CONTROLLING THE INTERACTIVE BEHAVIOR OF A ROBOT

(75) Inventor: Michael Gienger, Frankfurt am Main (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 1230 days.

(21) Appl. No.: 11/765,976

(22) Filed: Jun. 20, 2007

(65) Prior Publication Data

US 2008/0009957 A1 Jan. 10, 2008

(30) Foreign Application Priority Data

Jun. 22, 2006 (EP) .................................... 06012901

(51) Int. Cl.
*G05B 15/00* (2006.01)

(52) U.S. Cl.
USPC ........................... 700/259; 700/258; 700/262

(58) Field of Classification Search
USPC .......... 700/29, 255, 245, 250, 253, 259, 262; 382/153
See application file for complete search history.

(56) References Cited

U.S. PATENT DOCUMENTS 4,412,293 A * 10/1983 Kelley et al. .................. 700/259
4,594,671 A * 6/1986 Sugimoto et al. ............. 700/263
5,040,056 A * 8/1991 Sager et al. ..................... 348/88
5,643,060 A * 7/1997 Sandhu et al. ................ 451/285
5,889,926 A * 3/1999 Bourne et al. ................ 700/255
6,002,971 A * 12/1999 Lucas ........................... 700/250
6,246,972 B1 * 6/2001 Klimasauskas ................... 703/2
6,556,893 B2 * 4/2003 Kumar et al. ................ 700/245
6,694,224 B2 * 2/2004 Ramanan ...................... 700/245

OTHER PUBLICATIONS

European Search Report, European Application No. 06012901, Feb. 26, 2007, 6 pages.
Hwang, Y.K. et al., "Self-Learning Control of Cooperative Motion for a Humanoid Robot," Proceedings of the 2006 IEEE International Conference on Robotics and Automation, Orlando, FL, IEEE, May 2006, pp. 475-480.

* cited by examiner

*Primary Examiner* — Stephen Holwerda
(74) *Attorney, Agent, or Firm* — Fenwick & West LLP

(57) ABSTRACT

A method for controlling behavior of an intelligent mechanical system having more than one degree of freedom. The method includes (a) providing a target to a selector unit that requires operation of actuators of the mechanical system; (b) generating by a selector unit more than one behavior commands adapted to reach the target; (c) simulating movements of the mechanical system for each behavior command by a computing unit of the mechanical system; (d) assessing fitness values for each simulated movements based on at least one objective; and (e) sending the behavior commands with a highest fitness value to the actuators of the mechanical system.

10 Claims, 3 Drawing Sheets

CONTROLLING THE INTERACTIVE BEHAVIOR OF A ROBOT

RELATED APPLICATION

This application is related to and claims priority to European Patent Application No. 06 012 901 filed on Jun. 22, 2006, entitled “Controlling the Interactive Behaviour of a Robot.”

FIELD OF THE INVENTION

The present invention relates to a method and system for computing and controlling the reactions of a robot in response to a dynamic environment, specifically to computing and controlling reactions of a robot to perform cooperative tasks that require dynamic interaction.

BACKGROUND OF THE INVENTION

In order to achieve a certain objective, the robot may perform more than one task. For example, when picking up an object from a person’s hand, the robot may extend its arm performing grasping motions, and then raise its arm. When the robot has more than one degree of freedom, there may be multiple solutions to achieve an objective, each solution involving different sets of commands.

Conventionally, a person generates commands for achieving certain objective outside the robot and then programs the robot to perform the tasks as instructed. In generating the commands, the person may consider various factors such as the time before achieving the objective, stability of movements, or whether any self collision in the parts of the robot occurs. Manually programming the robot for each objective, however, is time consuming.

SUMMARY OF THE INVENTION

It is an object of the present invention to improve the interaction of a mechanical system such as a robot in an environment.

One embodiment of the present invention provides a method for controlling the behavior of an intelligent mechanical system such as a robot having a multiple degrees of freedom that enables the mechanical system to carry out different movement behaviors. In this embodiment, a target is provided to the selector unit of the mechanical system. The selector unit then generates a plurality of behavior commands adapted to reach the defined target. For each alternative command, the corresponding resulting movements of the mechanical system are simulated by a computing unit integrated with the mechanical system. Then it is determined whether movements of the simulation match at least one of the objectives as defined by the target. The commands resulting in the simulated movement with the highest fitness value are sent to the physical actuators of the mechanical system.

“Internally simulating” refers to autonomous simulation of different alternative movements by the mechanical system using an integrated computing unit.

In one embodiment of the present invention, the mechanical system is an autonomous robot.

In one embodiment of the present invention, the target is obtained from a visual system of the mechanical system.

In one embodiment of the present invention, the simulation is carried out using an Inverse Dynamics or Inverse Kinematics approach.

In one embodiment of the present invention, the fitness value is calculated using a cost function.

In one embodiment of the present invention, the speed of internal simulation process is set faster than the mechanical response time of the underlying mechanical system.

In one embodiment of the present invention, the processing steps are carried out in an iterative manner.

In one embodiment, the simulation comprises detecting self collision, avoiding the self collision or avoiding external objects.

The simulation is a kinematics simulation of the motion or a dynamic simulation considering the motion and the force interaction of the system.

In one embodiment of the present invention, a controller that implements such a method is provided.

In one embodiment of the present invention, a robot including such a controller is provided.

In one embodiment of the present invention provides a computer software product that implements the method when operated on a computing device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
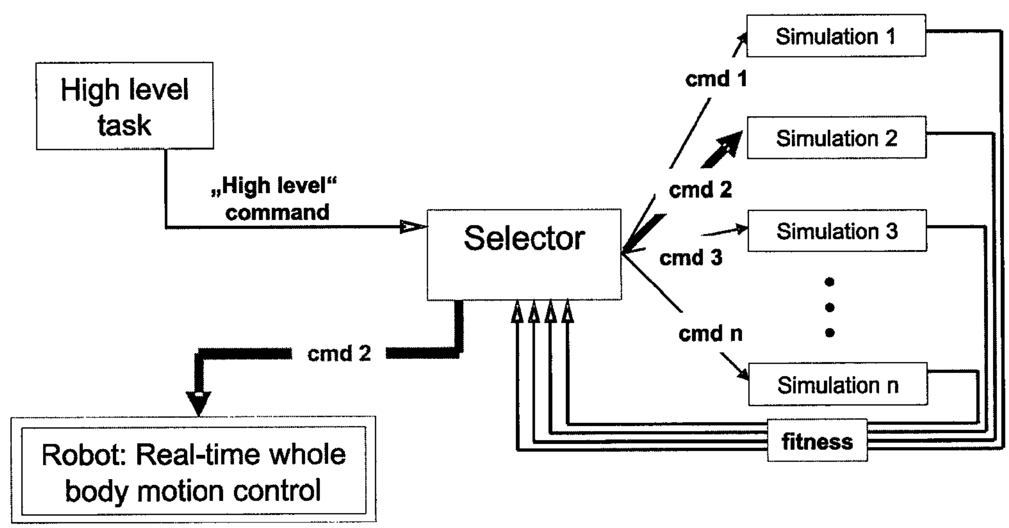
FIG. 1 is a schematic block diagram illustrating a method of controlling the interactive behavior of a robot, according to one embodiment of the present invention.

A preferred embodiment of the present invention is now described with reference to the figures where like reference numbers indicate identical or functionally similar elements.

Reference in the specification to “one embodiment” or to “an embodiment” means that a particular feature, structure, or characteristic described in connection with the embodiments is included in at least one embodiment of the invention. The appearances of the phrase “in one embodiment” in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention provides an intelligent mechanical system (e.g., a robot) having multiple degrees of freedom to enable the mechanical system to perform different movement behaviors.

"Intelligent" means that a mechanical system is provided with a computing unit capable of processing high-level commands, and controlling physical behaviors of the mechanical system in response to these high-level commands. The physical behaviors in response to the high-level command (which may be related to the environment) represent interactive behaviors.

In one embodiment, the mechanical system is designed to "switch" behaviors among alternative behavior options. The physical behavior to be actually performed by the mechanical system (not merely internal simulations) may be selected based on internal simulation architecture as illustrated in FIG. 1. Referring to FIG. 1, a high level command derived from a high-level task such as a target determined by a vision system of a robot or other sensing systems (e.g. acoustic sensors) is sent to a selection instance (Selector). The target may be abstract does not necessarily correspond to a robot-specific target description.

The high-level task can be generated by the robot itself using, for example, object recognition or by receiving an external command.

In a second step of the embodiment, the high-level task is processed by the selector. The selector generates different commands cmd 1, cmd 2, . . . , cmd n from the abstract target. Individual commands for achieving the high-level task can be generated. These commands cmd 1, cmd 2, . . . , cmd n correspond to control inputs that can physically control the underlying robot or other mechanical system with multiple degrees of freedom. There is no upper limit as to the number of commands cmd 1, cmd 2, . . . cmd n that can be generated.

In a third step of the embodiment, each individual command is passed to an internal simulator of the underlying robot or system. This internal simulator receives the commands and simulates by computation the respective movements of the robot or system. In robot control, the simulation is performed, for example, using the method of "Inverse Kinematics" or "Inverse Dynamics."

In a subsequent step of the embodiment, the internal simulator evaluates the simulated motions by computing a fitness value from a cost function representing different objectives. The objectives include, among other objectives, optimization of the speed, reducing the resources consumed.

The "cost function" and "fitness value" are well-recognized terms in the field of optimization. The cost function value depends on a given interactive scenario. An example of obtaining the cost function is illustrated below in detail.

In a next step, each of the individual internal simulation instances communicates its cost value back to the selector. The selector then chooses the most adequate simulation for the specific context, for example, by applying a "winner takes all" strategy on the fitness values. The chosen simulation instance is sent to the physical robot or system.

The processing speed of the internal simulation may be faster than the real time. That is, the internal simulation instance can decide whether a strategy is suitable before the physical robot reaches such a state. This can be termed "internal prediction" capability.

The presented method can work in iterative steps. That is, the loop between the selector, simulator, and the robot or system is updated within very short time intervals (e.g., 1 millisecond). This allows the robot or system to react quickly to changing environments, as the changes will be reflected in the current "high level command." Therefore, the behavior of the robot or system can be updated during an ongoing execution of a task.

The internal simulator fully simulates a robot controller. The simulation includes self-collision detection, self-collision avoidance, and avoidance of external objects.

The simulation can be a kinematics simulation (considering only the motion) or a dynamics simulation (considering also the force interaction of the system).

Figure 2:
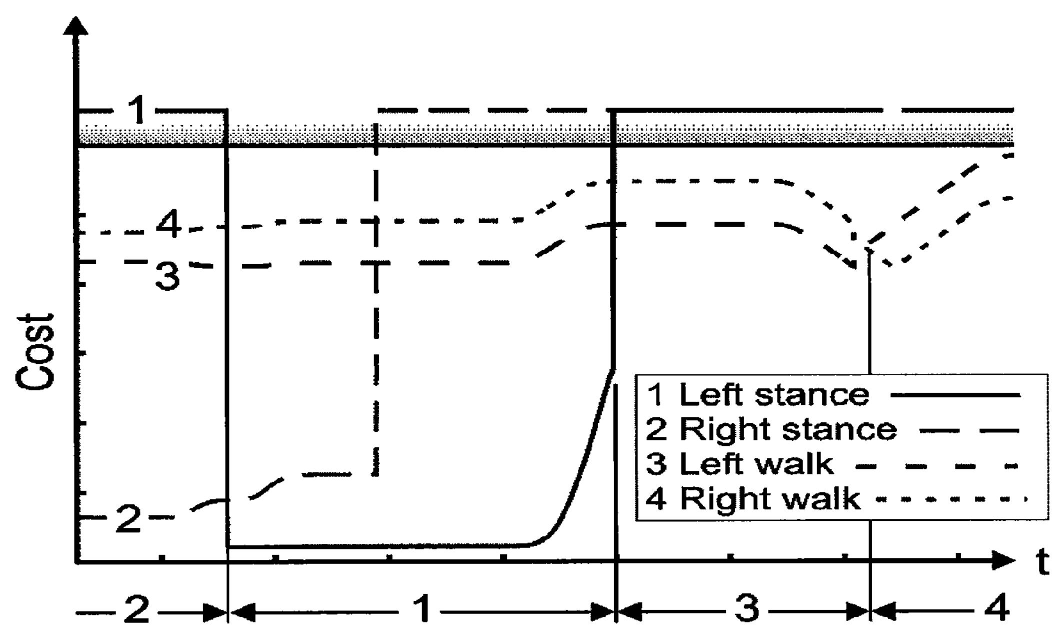
FIG. 2 is a graph illustrating fitness functions of four simulation instances with progress of time, according to one embodiment of the present invention.

In this example, a robot grasps an object from a human hand. The human holds the object and can move about arbitrarily. The "high level command" is the coordinates of the object extracted, for example, by a camera system. A selector separates the commands as shown in FIG. 2 from the following alternatives, for example: (1) assign the coordinates of the object to the left hand, stand still (Alternative 1); (2) assign the coordinates of the object to the right hand, stand still (Alternative 2); (3) assign the coordinates of the object to the left hand, walk (Alternative 3); and (4) assign the coordinates of the object to the right hand, walk (Alternative 4).

Each simulation is then evaluated. The selection of the most appropriate strategy is based on the evaluation of a multi-criteria cost function (fitness function). In this example, a robot must grasp an object out of the human hand. Therefore "grasping the object" is the high level command.

In this example, the cost function encodes the following heuristics: Standing will be preferred over walking, and walking over doing nothing. The fitness function incorporates the following criteria: (1) Reachability of the target—If the target cannot be reached, a high penalty is added to the cost function. A strategy that does not reach the target will not be selected; (2) Postural discomfort—A "discomfort" penalty is defined by the weighted least squares distance of the joints from their center positions. Whenever the target moves from one side to the other, this penalty will force the system to switch the reaching arm; (3) "Laziness"—Both walking strategies receive a penalty is constant. Thus, standing will be preferred over walking; and (4) Time to target—This penalty is added to the walking strategies. This is measured by the estimated time before reaching the target. This penalty makes the robot select the strategy that brings it towards the target with the minimum number of steps.

The embodiment allows incorporation of more advanced decision mechanisms and to formulate arbitrary complex criteria. The robot behavior based on this mechanism is shown, for example, in FIG. 2.

When moving the object from the left to the right, the robot will first (period 1 of FIG. 2) try to reach it with the right hand, and then dynamically switch to the left hand (period 2 of FIG. 2).

If the object is beyond reach, the robot will start walking and follow the object (period 3 of FIG. 2).

Figure 3:
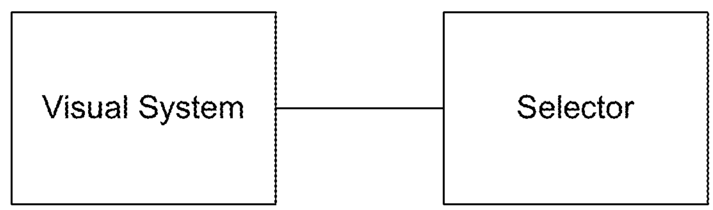
FIG. 3 is a diagram illustrating a visual system and a selector, according to one embodiment of the present invention.

In period 3 of FIG. 3, the robot tries to reach the object with the left hand while walking.

In period 4 of FIG. 3, the robot tries to reach the object with the right hand while walking.

FIG. 2 shows the changes in the cost functions of the four alternatives over the progress of time. The cost function with the lowest value is considered the best option. The periods within which the respective strategies are active, are shown under the time axis.

From FIG. 2, it is evident that, while attempting to carry out the high-level command, the internal simulation iteratively continues to compute the best behavior option in view of the current status in the execution of the high-level task.

The selector of the embodiment of the present invention that uses internal simulations as describe above may be applied to other robots or systems.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for controlling a behavior of an autonomous robot having more than one degree of freedom, the robot configured to walk and grasp a physical object, the method comprising:

(a) determining a current position of a moving physical target object through a camera system of the robot capturing images of the moving physical target object, the camera system coupled to a selector unit;

(b) sending the determined position of the moving physical target object to the selector unit that controls an operation and movement of actuators of at least one actuator of the robot or the robot relative to the position of the moving physical target object;

(c) generating, by the selector unit, a plurality of behavior commands, wherein each generated behavior command corresponds to instructions for moving the at least one actuator of the robot or the robot towards the moving physical target object for the robot to make a physical contact with the moving physical target object;

(d) simulating, by a computing unit of the robot, the movements of the at least one actuator of the robot or the robot according to the instructions corresponding to each generated behavior command for approaching the moving physical target object with the at least one actuator of the robot;

(e) assessing a fitness value for each simulated behavior command feasible for approaching the moving physical target object with the at least one actuator of the robot based on at least one objective;

(f) sending the behavior command of the generated plurality of behavior commands with a highest fitness value to the actuators of the robot for moving the at least one actuator or the robot to physically contact the moving physical target object based on the determined position of the moving physical target object;

(g) while executing the sent behavior command, assessing the fitness values associated with behavior commands other than the sent behavior command based on a changed position of the moving physical target object; and (h) repeating (b) sending through (g) assessing using the changed position as a current position until the moving physical target object is contacted by the robot.

2. The method of claim 1, wherein the computing unit simulates the movements using an Inverse Dynamics or Inverse Kinematics.

3. The method of claim 1, wherein the fitness value is calculated using a cost function.

4. The method of claim 1, wherein the computing unit simulates at a speed higher than the mechanical response time of the robot.

5. The method of claim 1, wherein (a) determining through (g) assessing are repeated.

6. The method of claim 1, wherein the step of simulating comprises detecting self collision, avoiding the detected self collision, and avoiding external objects.

7. The method of claim 1, wherein the simulation comprises performing a kinematics simulation of the motion or performing a dynamics simulation.

8. A controller for controlling behavior of an autonomous robot having more than one degree of freedom, the robot configured to walk and grasp a physical object, the controller configured to:

(a) determine a current position of a moving physical target object through a camera system of the robot capturing images of the moving physical target object, the camera system coupled to a selector unit;

(b) send the determined position of the moving physical target object to the selector unit that controls an operation and movement of actuators of at least one actuator of the robot or the robot relative to the position of the moving physical target object;

(c) generate, by the selector unit, a plurality of behavior commands, wherein each generated behavior command corresponds to instructions for moving the at least one actuator of the robot or the robot towards the moving physical target object for the robot to make a physical contact with the moving physical target object;

(d) simulate, by a computing unit of the robot, the movements of the at least one actuator of the robot or the robot according to the instructions corresponding to each generated behavior command for approaching the moving physical target object with the at least one actuator of the robot;

(e) assess a fitness value for each simulated behavior command feasible for approaching the moving physical target object with the at least one actuator of the robot based on at least one objective;

(f) send the behavior command of the generated plurality of behavior commands with a highest fitness value to the actuators of the robot for moving the at least one actuator or the robot to physically contact the moving physical target object based on the determined position of the moving physical target object;

(g) while executing the sent behavior command, assess the fitness values associated with behavior commands other than the sent behavior command based on a changed position of the moving physical target object; and (h) repeat (b) sending through (g) assessing using the changed position as a current position until the moving physical target object is contacted by the robot.

9. An autonomous robot configured to walk and grasp a physical object, the robot comprising a controller adapted to:

(a) determine a current position of a moving physical target object through a camera system of the robot capturing images of the moving physical target object, the camera system coupled to a selector unit;

(b) send the determined position of the moving physical target object to the selector unit that controls an operation and movement of actuators of at least one actuator of the robot or the robot relative to the position of the moving physical target object;

(c) generate, by the selector unit a plurality of behavior commands, wherein each generated behavior command corresponds to instructions for moving the at least one actuator of the robot or the robot towards the moving physical target object for the robot to make a physical contact with the moving physical target object;

(d) simulate, by a computing unit of the robot, the movements of the at least one actuator of the robot or the robot according to the instructions corresponding to each generated behavior command for approaching the moving physical target object with the at least one actuator of the robot;

(e) assess a fitness value for each simulated behavior command feasible for approaching the moving physical target object with the at least one actuator of the robot based on at least one objective;

(f) send the behavior command of the generated plurality of behavior commands with a highest fitness value to the actuators of the robot for moving the at least one actuator or the robot to physically contact the moving physical target object based on the determined position of the moving physical target object;

(g) while executing the sent behavior command, assess the fitness values associated with behavior commands other than the sent behavior command based on a changed position of the moving physical target object; and (h) repeat (b) sending through (g) assessing using the changed position as a current position until the moving physical target object is contacted by the robot.

10. A computer readable storage medium structured to store instructions executable by a processing system operatively coupled to an autonomous robot configured to walk and gasp a physical object, the instructions when executed cause the processing system to:

(a) determine a current position of a moving physical target object through a camera system of the robot capturing images of the moving physical target object, the camera system coupled to a selector unit;

(b) send the determined position of the moving physical target object to the selector unit that controls an operation and movement of actuators of at least one actuator of the robot or the robot relative to the position of the moving physical target object;

(c) generate, by the selector unit a plurality of behavior commands, wherein each generated behavior command corresponds to instructions for moving the at least one actuator of the robot or the robot towards the moving physical target object for the robot to make a physical contact with the moving physical target object;

(d) simulate, by a computing unit of the robot, the movements of the at least one actuator of the robot or the robot according to the instructions corresponding to each generated behavior command for approaching the moving physical target object with the at least one actuator of the robot;

(e) assess a fitness value for each simulated behavior command feasible for approaching the moving physical target object with the at least one actuator of the robot based on at least one objective;

(f) send the behavior command of the generated plurality of behavior commands with a highest fitness value to the actuators of the robot for moving the at least one actuator or the robot to physically contact the moving physical target object based on the determined position of the moving physical target object;

(g) while executing the sent behavior command, assess the fitness values associated with behavior commands other than the sent behavior command based on a changed position of the moving physical target object; and (h) repeat (b) sending through (g) assessing using the changed position as a current position until the moving physical target object is contacted by the robot.

* * * * *